UNITED STATES PATENT OFFICE.

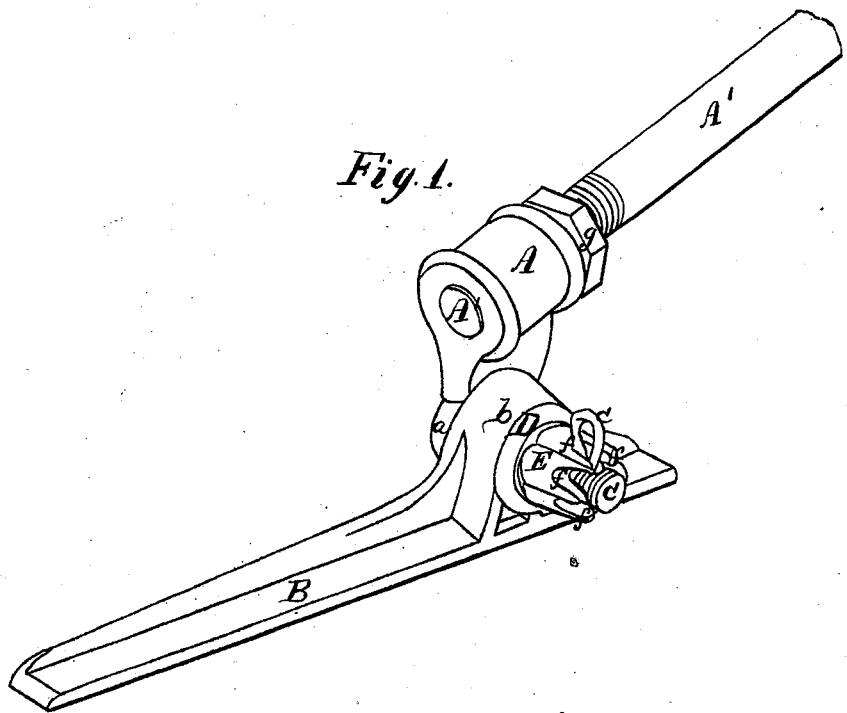
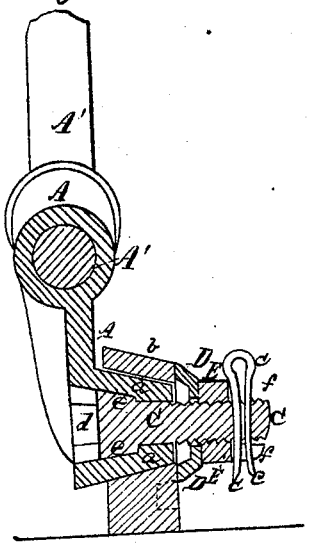

W. K. MILLER, OF CANTON, OHIO.

IMPROVEMENT IN PITMAN-CONNECTIONS.

Specification forming part of Letters Patent No. 92,628, dated July 13, 1869.

*To all whom it may concern:*

Be it known that I, WILLIAM K. MILLER, of Canton, in the county of Stark and State of Ohio, have invented certain new and useful Improvements in Pitman-Connections; and I do hereby declare the following to be a full, clear, and exact description of the same, reference being had to the accompanying drawings, making a part of this specification, in which—

Figure 1 represents in perspective the pitman-connection. Fig. 2 represents a section through the same.

Similar letters of reference, where they occur in the separate figures, denote like parts of the connection in both of them.

My invention consists in the manner in which I make a pitman-connection, so that while the parts may be brought up when worn to prevent rattle and noise, the device for holding the parts in such adjusted condition shall always be present and capable of holding the nut on the take-up bolt wherever said nut may be.

To enable others skilled in the art to make and use my invention, I will proceed to describe the same with reference to the drawings.

A B represent two parts of a pitman-connection such as are used on harvesting-machines. On the part A there is a conical journal, *a*, and on the part B there is a conical box or bearing, *b*, in which the journal *a* works. A bolt, C, passes through the journal and bearing, and a hollow washer, D, is first placed over said bolt, and then a nut, E, is run down on said bolt, which is a screw-bolt, and a key, *c*, is applied to hold the nut from turning. This description includes in a general way the construction of the pitman-connection; but there are specialties in the devices which make the contrivance highly valuable and convenient, as follows: The conical journal *a* is formed with a countersink, *d*, of the shape of and that will receive the head *e* of the bolt, and prevent the bolt from turning when the nut on the other end of it is run up with a wrench or otherwise.

The washer D is hollow, so that as the bearing-surfaces are worn away and drawn together to prevent noise and clatter the conical point of the journal *a* may be drawn into such hollow portion, and thus give a greater range of adjustment and taking up of wear.

The nut E is of peculiar construction. It is cast with a scalloped or turreted end, as seen at *f*, and the key *c*, passing between these scallops or turrets and through the screw-bolt C, prevents the nut from turning, and consequently from getting loose or dropping off, which generally breaks the pitman-connection. The scallops in the nut are deep enough or the turrets long enough to make the key catch and hold in or on them until the whole amount of available adjustment is exhausted or the connection worn out. The wearing of this connection, and the consequent taking up of the wear by the screw-bolt, sometimes disarranges the throw of the pitman, and it becomes a little too short or a little too long, either of which is very objectionable and, indeed, highly disadvantageous to the true working of the pitman and the machinery driven through or by it; and to remedy this the pitman-rod A' is screwed into its head A, and there is a jam-nut, *g*, upon it, so that the rod can be lengthened or shortened and the jam-nut then run up to secure it in its adjusted position.

Having thus fully described my invention, what I claim therein as new, and desire to secure by Letters Patent, is—

In combination with the conical bearing and journal and through screw-bolt for drawing and holding them together, a scalloped or turreted nut, and a key for preventing said nut from turning on said screw-bolt, substantially as described.

W. K. MILLER.

Witnesses:
 WM. MCKINLEY, Jr.,
 W. H. WYANT.